Figure 1:
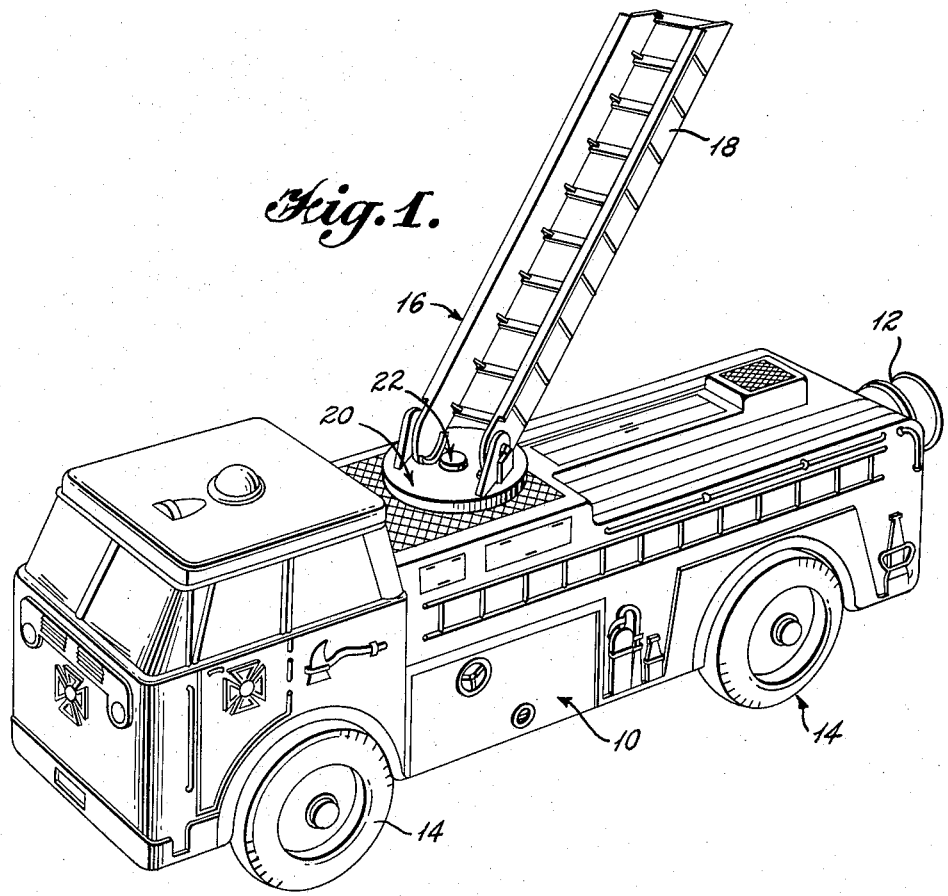

April 19, 1966   L. C. DOUGLAS   3,246,421
ATTACHMENT ARRANGEMENT FOR BLOW MOLDED PLASTIC BOTTLES
Filed July 14, 1964

INVENTOR.
Livingston C. Douglas

3,246,421
Patented Apr. 19, 1966

3,246,421
ATTACHMENT ARRANGEMENT FOR BLOW MOLDED PLASTIC BOTTLES
Livingston C. Douglas, Leonia, N.J., assignor to Colgate-Palmolive Company, New York, N.Y., a corporation of Delaware
Filed July 14, 1964, Ser. No. 382,569
7 Claims. (Cl. 46—11)

This application is a continuation-in-part of copending application Serial No. 273,046, filed April 15, 1963.

This invention relates to improvements in attachment arrangements for blow molded plastic bottles.

Blow molded bottles of resilient organic plastic have come into widespread use, and these bottles have been molded to simulate various toys, dolls, and the like. In these blow molded plastic bottle simulated toys, as well as in other application of blow molded plastic bottles, it has become quite desirable to attach an article to the bottle. For example, as shown in the aforesaid co-pending application, the plastic bottle may be blow molded in the form of a simulated vehicle and an article forming a component of the vehicle may be attached thereto to form the complete bottle simulated vehicle.

There exists in the art a real problem of attaching anything to blow molded plastic bottles. Various arrangements have been attempted including gluing, encircling bands, plastic welding, and others, but these previous attachment arrangements have not proved completely satisfactory for various reasons. It is the object of this invention to provide an attachment arrangement to enable successful attachment of a separate article to a blow molded plastic bottle, the attachment arrangement including a hollow projecting knob and mating female fitting with one element of the fitting on the blow molded plastic bottle and the other element of the fitting on the separate article to be attached.

In constructing blow molded plastic containers to hold liquids, extremely sharp angles close to one another should be avoided as such angles in the container cause the devolpment of stress cracking and pin holes. Certain attachment arrangements with buttons or knobs would have sharp angles close together and leakage would develop in the container. It is also an object of this invention to provide an attachment arrangement in the wall structure of a blow molded plastic bottle which will not crack or allow the contents of the bottle to leak therethrough.

The foregoing and other objects, features and advantages of the invention will be apparent from the following more particular description of a preferred embodiment of the invention as illustrated in the accompanying drawing.

Figure 2:
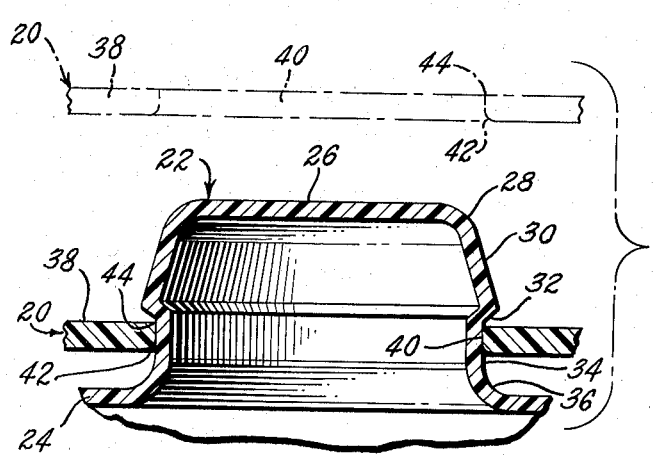

In the drawing:

FIG. 1 is a perspective view of a blow molded plastic bottle, molded to simulate a toy vehicle, and showing the attachment arrangement of this invention for attaching a simulated component, and, FIG. 2 is an enlarged detail sectional view of the attachment arrangement of this invention.

Referring now to the drawings, there is shown in FIG. 1 a bottle 10 blow molded of resilient organic plastic and simulating a toy, namely, a fire truck of the hook and ladder type. The blow molded plastic bottle includes a filling neck 12 with threads for a screw cap closure (not shown) and separate wheel units 14 which may be attached.

To make the simulated vehicle more realistic and usable as a toy, it is desirable to have a movable hook and ladder attachment assembly 16. This assembly includes a ladder 18 pivoted on an attachment base 20. A projecting knob 22 is molded integral with the plastic bottle 10 and is hollow. The attachment base 20 is snapped onto the projecting knob 22 to attach the hook and ladder assembly to the simulated fire truck formed by the blow molded plastic bottle. Obviously, the attachment arrangement need not be for a fire truck of this specific type and various other arrangements will be apparent to those skilled in the art, for example the arrangement shown in the aforesaid parent application.

The details of the attachment arrangement are shown in FIG. 2. The plastic bottle 10 includes side walls 24 shown in section in FIG. 2 from which the knob 22 projects. As can be seen, the knob 22 is integral with the side walls 24 and has substantially the same wall thickness, and of course any fluid contents of the bottle in contact with wall 24 would also be in contact with the under side of knob 22. Thus, it is essential that the knob be constructed so that it not crack and cause the bottle to leak. The knob 22 includes a substantially flat outer end portion or top 26 having rounded corners 28 merging into a conically tapered side wall portion 30. The conically tapered side wall portion 30 ends in a reverse conically tapered locking portion 32. Below locking portion 32 there is a reduced diameter neck 34 which merges into bottle wall 24 at a rounded juncture 36.

The hook and ladder attachment 16 includes in its attachment base 20 an attachment portion 38 having a circular opening or hole 40. The diameter of the hole 40 is less than the greatest outside diameter of the conically tapered side wall 30 at the lower end thereof. The thickness of attachment portion 38 adjacent and around hole 40 is less than the distance between the top of bottle side wall 24 and the end of conically tapered side portion 30. The side edge 42 of hole 40 to be slipped over knob 22 is generally rounded while the opposite side edge 44 is not rounded for better holding action.

In operation, the attachment device, which may be a simulated component of a toy such as the hook and ladder assembly 16, is positioned as shown in dotted lines in FIG. 2 with the hole 40 of attachment portion 38 above the integral projecting knob 22. The attachment portion is then moved vertically downward or inward toward the bottle so that it contacts the conically tapered side wall 30 and slightly compresses the same and with continued downward movement passes over the lower end of side wall 30 and onto reduced diameter neck portion 34. This compression occurs by virtue of the resilient nature of the hollow resilient organic material, for example polyethylene. Reverse movement is normally prevented by reverse conically tapered locking portion 32 so that the attachment portion 38 is held on to the knob 22 around the reduced diameter neck portion 34. Depending upon the diameter of the hole 40 and thickness of the attachment portion 38, the device can be allowed to freely move about the axis of the hole and projecting knob 22 or can be made to frictionally bind on the knob and therefore be held substantially in the same place.

As an example of the present invention applied to a commercial embodiment, fire truck simulated containers have been blow molded of linear polyethylene to hold liquid soap and the like. Attachment knob 22 extends 0.105 inch from the wall with the tapered side wall portion 0.05 inch high. The widest diameter of the tapered side portion is 0.200 inch and the diameter of the neck is 0.185. All of these dimensions plus or minus 0.003 inch. The opening in the attachment device is 0.180 inch in diameter and is rounded on its lower edge. If the attachment device has other components which project upwardly therefrom these components must allow clearance of course for the tapered side portion.

It can thus be seen that applicant has provided a unique arrangement for attaching a separate device to a blow molded plastic bottle, the attachment arrangement being molded into the bottle wall at the time the bottle is made and the attached device merely being provided with an attachment portion having a hole related to the projecting knob on the bottle. It has been found experimentally that the construction disclosed can be used a great many times for attaching articles without cracking the bottle wall and allowing the contents to leak. If desired, the attachment portion can be made of frangible material so that separation of the attachment from the bottle cannot be accomplished without breaking the attachment portion.

While the invention has been particularly shown and described with reference to a preferred embodiment, it will be understood by those skilled in the art that various changes in the form and details may be made without departing from the spirit of this invention. For example, the projecting knob does not need to be integral with the container wall but could be on the attachment arrangement with the container wall having a recess providing the opening. Furthermore, the projecting knob and cooperating opening need not be circular as they may be other geometric shapes so long as the opening is substantially the same shape as the neck. Obviously, the simulated toy does not need to be a fire truck or even a vehicle. Liquid holding containers simulating a castle turret have been found to be successful in which the attachment arrangement is a recess molded into the turret wall forming the opening portion of the attachment arrangement while the attachment article is a simulated castle wall with a projecting knob for snapping into the recess. Therefore the invention is limited only by the following claims.

What is clamed is:

1. An attachment arrangement for attaching a separate article to a blow molded plastic bottle type article, the attachment arrangement comprising; a blow molded plastic bottle type article capable of holding liquid, a separate article to be attached to the plastic article, a plastic projecting knob on one of the articles, the knob including an outer end portion, a tapered side portion adjacent the end portion with its narrower dimension, adjacent the outer end and a reduced neck portion below the tapered side portion and most remote from the outer end, the other of said articles including an attachment portion with an opening therein, the opening being of substantially the same size and shape as the reduced neck portion with dimensions less than the largest diameter of the tapered side portion, the thickness of the attachment portion around the opening being not substantially greater than the length of the reduced neck portion so that the articles may be attached together by inserting the opening over the projecting knob and pressing the articles together until the opening passes over the tapered side portion of the knob and surrounds the reduced neck portion.

2. An attachment arrangement as defined in claim 1 wherein the knob is hollow, resilient, and integral with the blow molded plastic bottle.

3. An attachment arrangement for attaching a separate article to a blow molded plastic bottle comprising; a blow molded plastic bottle type article capable of holding fluid, an attachment article to be attached to the bottle, a hollow plastic projecting knob integral with one of the articles and forming a portion thereof, the hollow projecting knob including a tapered side portion near the outer end thereof with its narrowest dimension adjacent the outer end, and a reduced neck portion below the tapered side portion merging into the article, an attachment portion with an opening therein integral with the other article, the diameter of the opening being slightly less than the largest dimension of the tapered side portion of the knob, the thickness of the attachment portion around the opening being not greater than the length of the reduced neck portion so that the attachment article may be attached to the blow molded plastic bottle by inserting the opening over the projecting knob and pressing it down over the tapered side portion of the knob until it clears the side portion and surrounds the reduced neck portion.

4. An attachment arrangement as defined in claim 3 wherein the knob has substantially the same wall thickness as the article it is integral with and further comprising a reverse tapered portion of the projecting knob between the tapered side portion and the reduced neck portion, and a rounded fillet where the reduced neck portion merges into the article.

5. An attachment arrangement as defined in claim 3 wherein the blow molded plastic bottle is formed as a simulated toy and the article to be attached is a simulated component of the toy.

6. An attachment arrangement for attaching a simulated toy component to a blow molded plastic bottle formed in the shape of a simulated toy less the component, the attachment arrangement comprising; a hollow projecting knob blow molded integrally with a wall of a blow molded plastic bottle simulated toy and therefore forming a portion of said wall, the knob having substantially the same wall thickness as the bottle wall, the projecting knob including a flat outer portion, a conically tapered side portion with its wider dimension closest to the bottle wall and connected to the bottle wall by a reverse conically tapered locking portion, a reduced neck portion merging into the bottle wall, the simulated toy component to be attached to the simulated toy blow molded plastic bottle including an attachment portion with a circular opening therein, the diameter of the circular opening being slightly less than the greatest diameter of the conically tapered side portion of the knob, the width of the attachment portion around the circular opening being less than the dimension between the wall of the bottle and the bottom of the tapered side portion so that the article may be attached to the blow molded plastic bottle by inserting the circular opening over the projecting knob and pressing it down over the tapered side portion until it surrounds the neck portion.

7. An attachment arrangement as defined in claim 6 wherein the bottle simulated toy is in the form of a simulated vehicle and the article to be attached is a simulated vehicle component.

References Cited by the Examiner

UNITED STATES PATENTS

| 985,078 | 2/1911 | Turner | 46—215 |
|---|---|---|---|
| 2,374,092 | 4/1945 | Glaser | 215—6 |
| 2,493,922 | 1/1950 | Miller | 215—6 |
| 2,947,053 | 8/1960 | Sanderson. | |
| 3,035,623 | 5/1962 | Goetz. | |
| 3,154,882 | 11/1964 | Bossiere | 46—11 |

FOREIGN PATENTS 201,324  12/1958  Austria.

RICHARD C. PINKHAM, *Primary Examiner.*